3,074,997
ALICYCLIC ESTERS OF BUTANE AND CYCLO-PENTANE POLYCARBOXYLIC ACIDS
John W. Lynn, Charleston, and Richard L. Roberts, Milton, W. Va., assignors to Union Carbide Corporation, a corporation of New York
No Drawing. Filed May 22, 1959, Ser. No. 814,990
7 Claims. (Cl. 260—468)

This invention relates to unsaturated esters having utility as polymerizable plasticizers for vinyl halide resins and being especially useful for use as intermediates in the preparation of valuable compounds. In a particular aspect, this invention is directed to unsaturated cycloaliphatic esters of 1,2,4-butanetricarboxylic acids.

This invention provides aliphatic triesters of 1,2,4-butanetricarboxylic acids having at least one olefinically-unsaturated alicyclic alcohol radical, and containing a total of at least eight carbon atoms in the three aliphatic alcohol radicals. The term "aliphatic" as used herein is meant to include both aliphatic and alicyclic structures.

A preferred class of esters of this invention are those corresponding to the general formula

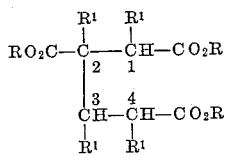

wherein $R^1$ is a member selected from the group consisting of hydrogen and lower alkyl radicals containing between one and about four carbon atoms; wherein R is an aliphatic radical and at least one R is an olefinically-unsaturated alicyclic radical, and the total number of carbon atoms in said R radicals is between eight and about sixty carbon atoms. By the expression "olefinically-unsaturated alicyclic radical" is meant an alicyclic radical having olefinic unsaturation in the cyclic nucleus struture, e.g., the cyclopentenyl radical.

Particularly preferred esters corresponding to the above general formula are those in which the aliphatic radical R is a member selected from the group consisting of alkyl and alkenyl radicals containing between one and eighteen carbon atoms, cycloalkyl and cycloalkenyl radicals containing between six and about eighteen carbon atoms, and at least one R is a cyclohexenyl radical and the total number of carbon atoms in said R radicals is between eight and forty-eight carbon atoms. These esters can contain halogen atoms and are further characterized as being free of acetylenic unsaturation. The terms "cycloalkyl" and "cycloalkenyl" as used herein include cycloalkylalkyl, cycloalkylalknyl, cycloalkenylalkyl and cycloalkenylalkenyl radicals.

The above general formula is meant to include triesters of 1,2,4-butanetricarboxylic acids which have the number one and number four carbon atoms of the acid moiety connected by a methylene group as illustrated by the following structure

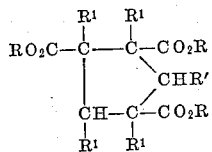

wherein R and $R^1$ are as defined hereinbefore.

Illustrative of preferred alicyclic esters are those in which $R^1$ is methyl, ethyl, propyl, isopropyl, butyl, isobutyl, and the like, and R is methyl, vinyl, ethyl, allyl, propyl, isopropyl, 2-methyl-1-propenyl, butyl, 2-butenyl, 2-methyl-2-butenyl, isobutyl, tertiary-butyl, amyl, 2-hexenyl, hexyl, heptyl, octyl, 2-octenyl, 2-ethylhexyl, 2-ethylhexenyl, nonyl, decyl, dodecyl, tridecyl, 9-octadecenyl, octadecyl, cyclopentyl, 2-cyclopentenyl, cyclohexyl, cycloheptyl, cyclohexylmethyl, 1-cyclohexenyl, 2-cyclohexenyl, 3-cyclohexenyl, 3-cyclohexenylmethyl, 1-methyl-3-cyclohexenylmethyl, 4-methyl-3-cyclohexenylmethyl, 6-methyl-3-cyclohexenylmethyl, 3-cyclohexenylethyl, 3-cyclohexenylpropyl, 3-cyclohexylpropenyl, bicyclo[2.2.1]-hept-2-yl, bicyclo[2.2.1]-hept-2-ylmethyl, and the like. Typical preferred alicyclic esters include 3-cyclohexenyl bis(methyl) 1,2,4-butanetricarboxylate; bis(3-cyclohexenylmethyl) vinyl 1,2,4-butanetricarboxylate; 3-cyclohexenylmethyl bis(2-ethylhexyl) 1,2,4-butanetricarboxylate; 2-cyclohexenyl bis("oxo" decyl)[1] 1,2,3,4-tetrachloro-1,2,4-butanetricarboxylate; 3-cyclohexenylmethyl bis(cyclohexylmethyl) 1,2,4-butanetricarboxylate; tris(3-cyclohexenyl) 1,2,4-butanetricarboxylate; 3-cyclohexenyl bis(9-octadecenyl) 1,2,4-butanetricarboxylate; tris(3-cyclohexenylmethyl) 1,2,4-butanetricarboxylate; 6-methyl-3-cyclohexenylmethyl 2,4-butanetricarboxylate; 6-methyl-3-cyclohexenylmethyl bis(2-ethyl-2-hexenyl) 1,2,4-cyclopentanetricarboxylate, and the like.

The novel unsaturated aliphatic esters of this invention are readily prepared by conventional esterification and transesterification methods from appropriate aliphatic alcohols and 1,2,4-butanetricarboxylic acids. In one direct esterification method, an alcohol such as 3-cyclohexen-1-methanol is reacted with a polycarboxylic acid such as 1,2,4-butanetricarboxylic acid in the presence of a strong acid catalyst such as para-toluenesulfonic acid with the continuous removal of water as an azeotrope with an entraining agent such as benzene or toluene. In another direct esterification method, the alcohol is reacted with the tricarboxylic acid which is in the form of its acid halide derivative in the presence of an acid-binding substance such as pyridine. In a transesterification method, an alcohol such as 3-cyclopenten-1-ol is reacted with an ester derivative such as triethyl 1,2,4-butanetricarboxylate in the presence of a catalyst such as tetralkyl titanate with the coninuous removal of the lower alcohol (e.g., ethanol) as a solitary distillation component or as an azeotrope with toluene or a similar entraining agent. The quantities of acid and alcohol reacted may be varied over broad molar ratios but it is usually preferred to employ either stoichiometric quantities of acid and alcohol or a small molar excess of alcohol. For example, for the preparation of an ester which has three similar alcohol moieties, the unsaturated aliphatic alcohol is reacted with the 1,2,4-butanetricarboxylic acid in the ratio of three moles of alcohol for each mole of tricarboxylic acid. In the case of an ester which has dissimilar alcohol moieties, the respective alcohols are employed in the appropriate ratio. For example, when three different alcohols are to be reacted with a 1,2,4-butanetricarboxylic acid, a ratio of one mole of each of the alcohols is employed for each mole of tricarboxylic acid. The alcohols can be reacted individually with the tricarboxylic acid, or the alcohols can be reacted simultaneously as a single mixture with the tricarboxylic acid. In either case, an equilibrium reaction product is formed.

The class of 1,2,4-butanetricarboxylic acids useful for the production of the novel esters of this invention are available by several preparative routes which are reported in the chemical literature. For example, 1,2,4-butanetricarboxylic acid can be prepared by the Michael condensation of methylene-succinic acid ester with malonic ester, or by the condensation of acrylonitrile with 1,1,2-ethanetricarboxylic acid. A preferred method of preparing 1,2,4-butanetricarboxylic acids is by the nitric ---
[1] The alcohol prepared by the "oxo" reaction of tripropylene with carbon monoxide and hydrogen.

acid oxidation of cyclohexene derivatives corresponding to the formulas

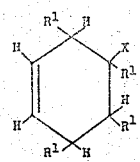

and

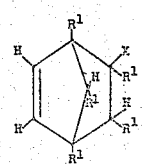

wherein X is a carboxyl group or a group convertible to a carboxyl group such as cyano, keto and amido groups, and $R^1$ is hydrogen or a lower alkyl group containing between one and four carbon atoms. The appropriate cyclohexene derivatives, in turn, are prepared by the Diels-Alder reaction of butadiene and other compounds of the conjugated diene series with mono-olefinic dienophiles having the double bond in a position vinyl to a carboxyl group or a group convertible to a carboxyl group. Suitable dienophiles are illustrated by acrylic acid, crotonic acid, acrylonitrile, alkyl acrylate, alkyl methacrylate, acrylamide, N,N - dialkylcrotonamide, and the like. Among the suitable conjugated dienes are included cyclopentadiene, butadiene, piperylene, isoprene, and the like.

The esters of this invention are useful as plasticizers for vinyl halide resins. The esters have low volatility and they exhibit good compatibility and good oil resistance when employed as plasticizers for vinyl halide resins. 3-cyclohexenylmethyl bis(2-ethylhexyl) 1,2,4-butanetricarboxylate is superior to dioctyl phthalate as a plasticizer for poly(vinyl chloride). The esters are especially useful as itnermediates in the preparation of valuable epoxy derivatives. The conversion of the esters to the epoxy derivatives is readily accomplished by epoxidation of the olefinic unsaturation with peracids such as peracetic acid and perbenzoic acid. Unsaturated alicyclic groups, particularly the cyclohexenyl radical, epoxidize exceptionally well. These unsaturated groups can be selectively epoxidized in the presence of other olefinic unsaturation in the molecules because of their ready susceptibility to epoxidation conditions. The epoxidized esters containing cyclohexene oxide groups are unique in that they have an extraordinary ability to react with free carboxylic acid groups. These particular highly reactive epoxy esters are valuable as monomers in the production of resins, and have other uses such as reagents for reducing the acid number of resins, e.g., polyesters, or as reactive species for increasing the molecular weight of resins which contain active hydrogen atoms.

The following examples will serve to illustrate specific embodiments of the invention.

*Example 1*

A mixture of 3-cyclohexen-1-methanol (336 grams, 3.0 moles), 1,2,4-butanetricarboxylic acid (190 grams, 1.0 mole), toluene (500 grams) and para-toluenesulfonic acid (5 grams) was heated to reflux and a water-toluene azeotrope was distilled off continuously over a ten-hour period. The product mixture was washed with a saturated sodium bicarbonate solution and with water, then volatile components were removed up to a temperature of 155° C. at a pressure of 2 millimeters of mercury. The residual oil product was treated with decolorizing charcoal and filtered to afford tris(3-cyclohexenylmethyl) 1,2,4-butanetricarboxylate in 95.4 percent yield having $n_D^{30}$ 1.4990, $d_{20}^{20}$ 1.0954 and molecular weight 461±40 (calculated, 472). The purity by saponification was 98.65 percent and the elemental analysis was as follows:

*Analysis.*—Calculated for $C_{28}H_{40}O_6$: C, 71.16; H, 8.53. Found: C, 71.77; H, 8.82.

*Example 2*

A mixture of 1,2,4-butanetricarboxylic acid (380 grams, 2 moles), 3-cyclohexen-1-methanol (448 grams, 4 moles), benzene (500 grams) and sulfuric acid (3.5 grams) was heated to reflux and water was removed azeotropically over a nine-hour period. Calcium acetate (7 grams) was added to the product mixture and the precipitated calcium sulfate was removed by filtration. Volatile components of the mixture were removed to a temperature of 150° C. at a pressure of 3 millimeters of mercury. Bis(3-cyclohexenylmethyl) hydrogen 1,2,4-butanetricarboxylate was obtained in 97.5 percent yield having $n_D^{30}$ 1.4972, $d_{20}^{25}$ 1.1207, and molecular weight of 388±40 (calculated, 378). The purity of the material by saponification was 100.4 percent and the elemental analysis was as follows:

*Analysis.*—Calculated for $C_{21}H_{30}O_6$: C, 66.64; H, 7.99. Found: C, 66.37; H, 7.92.

A mixture of bis(3-cyclohexenylmethyl) hydrogen 1,2,4-butanetricarboxylate (300 grams, 0.795 mole), toluene (430 grams), zinc oxide (5 grams) and anhydrous zinc acetate (8 grams) was charged to a three-liter "316" stainless steel bomb in a rocking furnace. The system was purged five times with nitrogen at room temperature, then nitrogen was added to a pressure of 25 p.s.i.g. and the system was heated to a temperature of 160° C. with rocking. Nitrogen was added to increase the pressure to 130 p.s.i.g., then acetylene was added until the pressure was 300 p.s.i.g. Reaction occurred at a temperature of 178° C. and the pressure was maintained in the range between 280 to 300 p.s.i.g. by the addition of acetylene. After six hours at a temperature of 178° C. to 191° C., the uptake of acetylene ceased. The system was cooled and the reaction mixture was discharged from the bomb. After the catalyst was removed by filtration, the filtrate was washed twice with 10 percent sodium carbonate solution and then with water. Hydroquinone (0.5 gram) was added to the mixture and toluene was removed by distillation. Bis(3-cyclohexenylmethyl) vinyl 1,2,4-butanetricarboxylate was recovered in 82 percent yield having $n_D^{30}$ 1.4958 $d_{20}^{20}$ 1.1058, and the following elemental analysis:

*Analysis.*—Calculated for $C_{23}H_{32}O_6$: C, 68.3; H, 7.97. Found: C, 68.8; H, 7.76.

*Example 3*

A mixture of 192 grams of 1,2,4-butanetricarboxylic acid (1 mole), 226 grams of 3-cyclohexen-1-methanol (2.02 moles), 131 grams of 2-ethylhexanol (1.01 moles), 1 gram of sulfuric acid and 500 grams of toluene was heated to reflux and water was removed azeotropically over an eleven-hour period. The product mixture was neutralized by washing with sodium bicarbonate solution, then washed with water. Volatile components of the organic layer were removed by evaporation to a temperature of 150° C. at a pressure of 1.8 millimeters of mercury. The residual product was treated with decolorizing charcoal and filtered to afford bis(3-cyclohexenylmethyl) 2-ethylhexyl 1,2,4-butanetricarboxylate in 81.9% yield having $n_D^{30}$ 1.4798, and a purity by saponification of 99.6%. The elemental analysis was as follows:

*Analysis.*—Calculated for $C_{29}H_{46}O_6$: C, 70.98; H, 9.45. Found: C, 70.80; H, 9.43.

*Example 4*

A mixture of 380 grams of 1,2,4-butanetricarboxylic acid (2 moles), 645 grams of "oxo" decanol (4 moles±2%), 230 grams of 3-cyclohexen-1-methanol (2 moles±2%), 300 milliliters of toluene, and 1.3 grams of sulfuric acid was heated to reflux for 8.5 hours while water was removed continuously as the toluene azeotrope.

The product mixture was washed with water, then with sodium bicarbonate solution and again with water. Volatile components of the organic layer were removed by evaporation to a temperature of 200° C. at a pressure of 4.0 millimeters of mercury. The filtered residual product, 3-cyclohexenylmethyl bis("oxo" decyl) 1,2,4-butanetricarboxylate was present in 85.7% yield and had $n_D^{30}$ 1.4650, $d_{20}^{20}$ 0.9750 and a purity of saponification of 98.7%.

*Example 5*

A mixture containing 570 grams of 1,2,4-butanetricarboxylic acid (3 moles), 795 grams of 2-ethylhexanol (6 moles±2%), 343 grams of 3-cyclohexen-1-methanol (3 moles±2%), 350 milliliters of toluene and 1.7 grams of sulfuric acid was heated to reflux for 11.5 hours, during which time water was removed continuously as the toluene azeotrope. The product mixture was washed with saturated sodium bicarbonate solution to neutralize the catalyst, then with water. The organic layer was freed of volatiles by evaporation to a temperature of 196° C. at 4 millimeters of mercury. The residual product (purity 96.5% by saponification) was recovered in 86.7% yield, and was further refined by molecular distillation on a spinning-plate still, to give refined 3-cyclohexenylmethyl bis(2-ethylhexyl) 1,2,4-butanetricarboxylate of 98% purity by saponification with $n_D^{30}$ 1.4642 and $d_{20}^{20}$ 0.9877.

What is claimed is:

1. A compound of the formula:

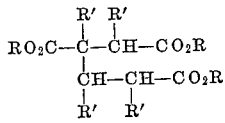

wherein R' is a member selected from the group consisting of hydrogen and a lower alkyl containing between one and about four carbon atoms; and R is a member selected from the group consisting of an alkyl and alkenyl containing between one and about eighteen carbon atoms and bicyclo [2.2.1]-hept-2-yl, bicyclo [2.2.1]-hept-2-ylmethyl, cycloalkyl, cycloalkylalkyl, cycloalkylalkenyl, cycloalkenylalkyl, cycloalkenyl, and cycloalkenylalkenyl containing between six and eighteen carbon atoms; at least one of the radicals designated by R being a member selected from the group consisting of a cyclohexenyl and cyclohexenylalkyl containing from six to about eighteen carbon atoms; and the total number of carbon atoms present in the radicals defined by R being between eight and forty-eight carbon atoms.

2. A compound of the formula:

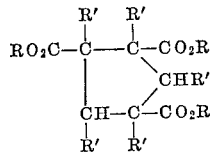

wherein R' is a member selected from the group consisting of hydrogen and a lower alkyl of from one to four carbon atoms; and R is a member selected from the group consisting of alkyl and alkenyl, each containing between one and eighteen carbon atoms and bicyclo [2.2.1]-hept-2-yl, bicyclo [2.2.1]-hept-2-ylmethyl, cycloalkyl, cycloalkylalkyl, cycloalkylalkenyl, cycloalkenylalkyl, cycloalkenyl and cycloalkenylalkenyl containing from six to eighteen carbon atoms; at least one of the radicals represented by R being a member selected from the group consisting of a cyclohexenyl and cyclohexenylalkyl containing from six to about eighteen carbon atoms; and the total number of carbon atoms present in the radicals defined by R being between eight and forty-eight carbon atoms.

3. Tris(3-cyclohexenylmethyl- 1,2,4-butanetricarboxylate.

4. Bis(3-cyclohexenylmethyl (vinyl 1,2,4-butanetricarboxylate.

5. Bis(3-cyclohexenylmethyl) 2-ethylhexyl 1,2,4-butanetricarboxylate.

6. 3-cyclohexenylmethyl bis(oxo process decyl) 1,2,4-butanetricarboxylate.

7. 3-cyclohexenylmethyl bis(2 - ethylhexyl) 1,2,4-butanetricarboxylate.

References Cited in the file of this patent
FOREIGN PATENTS
571,111    Canada _____ Feb. 24, 1959